(12) United States Patent
Carr

(10) Patent No.: US 9,383,210 B2
(45) Date of Patent: Jul. 5, 2016

(54) IMAGE NAVIGATION AND REGISTRATION (INR) TRANSFER FROM EXQUISITE SYSTEMS TO HOSTED SPACE PAYLOADS

(71) Applicant: James L. Carr, Washington, DC (US)

(72) Inventor: James L. Carr, Washington, DC (US)

( * ) Notice: Subject to any disclaimer, the term of this patent is extended or adjusted under 35 U.S.C. 154(b) by 0 days.

(21) Appl. No.: 14/610,091

(22) Filed: Jan. 30, 2015

(65) Prior Publication Data

US 2015/0211864 A1    Jul. 30, 2015

Related U.S. Application Data

(60) Provisional application No. 61/933,574, filed on Jan. 30, 2014.

(51) Int. Cl.
*G01C 21/24* (2006.01)
*G01C 21/00* (2006.01)
*G01C 21/02* (2006.01)

(52) U.S. Cl.
CPC .............. *G01C 21/24* (2013.01); *G01C 21/005* (2013.01); *G01C 21/02* (2013.01)

(58) Field of Classification Search
CPC ...... G01C 11/04; G01C 11/28; G01C 21/005; G01C 21/02; G01C 21/24
See application file for complete search history.

(56) References Cited

U.S. PATENT DOCUMENTS

2015/0220568 A1*  8/2015  Ueda ................ G01C 21/005
                                               707/722

* cited by examiner

*Primary Examiner* — Michael D Lang
(74) *Attorney, Agent, or Firm* — Ober, Kaler, Grimes & Shriver; Royal W. Craig

(57) ABSTRACT

A system and method for improved image navigation and registration on a low cost remote sensing satellite based on reference image data received from an exquisite system.

36 Claims, 3 Drawing Sheets

IMAGE NAVIGATION AND REGISTRATION (INR) TRANSFER FROM EXQUISITE SYSTEMS TO HOSTED SPACE PAYLOADS

CROSS-REFERENCE TO RELATED APPLICATION(S)

The present application derives priority from U.S. Provisional Patent Application 61/933,574 filed 30 Jan. 2014.

BACKGROUND OF THE INVENTION

1. Field of the Invention

The present invention relates to satellite surveillance and remote sensing and, more particularly, to a system and method for accurately referencing satellite imagery with respect to geographic locations.

2. Description of the Background

Image Navigation and Registration (INR) systems are widely used in the field of satellite remote sensing, particularly in geostationary weather satellites. A remote sensing satellite collects information about an object or phenomenon within the Field of Regard (FOR) of its sensor. When satellites are placed into geostationary orbit, they are able to view or track a given position on the Earth's surface during the Earth's entire rotational period, semi-indefinitely. Satellites in highly elliptical, polar or near-polar orbits have long dwell times at a given point in the sky during their approach to and descent from apogee, and thus are also able to maintain a single point or points of the Earth's surface within their FOR for an extended period of time. Satellites in low altitude orbits are only briefly able to observe a given position on the Earth with each overpass, but a constellation of such satellites can provide persistent coverage.

Geostationary or highly elliptical, near-polar orbits are commonly used for communications satellites which need a relatively "fixed" position in the sky, as seen from the Earth, in order to maintain continuous contact with a ground location. A geostationary orbit is a circular orbit above the Earth's equator and following the direction of the Earth's rotation, and thus the satellite appears motionless. An example of a highly elliptical orbit is the Molniya satellite system used by the former Soviet Union. Here, satellites were placed into highly eccentric elliptical orbits known as Molniya orbits that allowed them to remain visible to sites in polar regions for extended periods. Geostationary and highly elliptical orbits are especially useful for weather satellites. Geostationary orbit allows a single satellite to monitor changes at a given point or points in the Earth's atmosphere over an entire 24-hour period extended period of time, whereas a highly elliptical, near-polar orbit makes this possible with two satellites. The NASA Tropospheric Emissions: Monitoring of Pollution (TEMPO) mission, for example, operates from a geostationary orbit to measure atmospheric pollution and air quality, including changes in aerosol loads, over a large portion of Greater North America (GNA). Because the instrument remains "fixed" over GNA for the entire mission, it can provide near-real-time air quality measurements to the public during daylight hours. Geostationary weather satellites can also be used to track the movements of weather systems.

In reality, even in the case of a geostationary satellite, orbital motion of the spacecraft causes changes to the satellite's position and orientation relative to the Earth's surface over time. Many of these satellites use INR systems to correct for these changes so that successive projections from the satellite's sensor have the same latitude and longitude on the Earth's surface. INR technology enables the accurate location of an image's individual pixels with respect to geographical coordinates. INR systems rely on sophisticated instrumentation to determine the absolute location and attitude, or orientation, of the orbiting spacecraft. They may also take into account internal configurations such as telescope magnification, the location of a scan mirror which determines the position of the sensor relative to the detector frame, and various other optical alignments.

Currently, state of the art INR systems have the ability to create data products where image pixels are assigned geographic coordinates with errors on the order of the pixel resolution or better. INR systems such as these are used in the Geostationary Operational Environmental Satellites (GOES), operated by the United States National Environmental Satellite, Data and Information Service (NESDIS), and the Meteosat satellites, operated by the European Organisation for the Exploitation of Meteorological Satellites (EUMETSAT), and are termed "exquisite" systems for their ability to geo-locate image pixels with extreme accuracy. However, exquisite systems are very expensive to build and deploy, and only a few mainly government entities, such as NESDIS and EUMETSAT, can afford to own and operate them.

There is, however, an emerging need to furnish high quality INR for lower cost space missions. Such missions may not have sufficient resources to afford their own purpose-built spacecraft with advanced attitude control capabilities, such as the stellar-inertial control system used by the GOES satellites, and may need to fly instead on less capable host spacecraft as secondary payloads. The TEMPO mission, for example, is hosted onboard a commercial geostationary communications satellite, achieving a modest cost.

Accordingly, a need in the art exists for a low cost system capable of measuring orientation and pixel location with a high degree of accuracy. A system and method for low cost, high precision INR by transferring geo-referenced pixel knowledge from an exquisite system to a less sophisticated system is herein presented. The system and method is well suited for use with a remote sensing device operating on a host spacecraft as a secondary payload or as a primary payload in a system where the host spacecraft costs must be kept very low.

SUMMARY OF THE INVENTION

It is, therefore, the primary object of the present invention to provide an improved INR system for use in connection with a low cost satellite remote sensing device hosted as a payload on a spacecraft lacking sophisticated attitude determination capabilities.

It is another object to provide a system capable of utilizing INR data transferred from an exquisite system, such as a GOES satellite, to improve the accuracy of its own INR without the use of an advanced attitude control system.

These and other objects are herein accomplished by a system and method for transferring INR data from an exquisite system for use in a hosted payload.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

The present invention is a system and method for utilizing the INR data from a highly accurate exquisite system to improve the image navigation ability of a low cost system that may not have access to sophisticated attitude or location measurement or control devices.

Although it should be understood that the instant invention can be applied to many types of remote sensing payloads in geostationary or other orbital regimes, for ease of understanding, it will be described herein with reference to the NASA TEMPO mission. TEMPO involves the deployment of a spectroscopic instrument to measure various elements of air pollution in the Earth's troposphere, in both the visible and ultraviolet spectra, over the Contiguous United States (CONUS) and parts of Canada and Mexico, comprising a region referred to as Greater North America (GNA). To obtain useful data, it is crucial that TEMPO maintain a consistent view of the GNA to capture changes in the measured compounds over the course of an entire day, as the diurnal cycle of emissions and air chemistry is highly variable. It is further necessary for TEMPO to maintain this view over an extended period of time to understand long-term changes in the atmosphere over GNA. Moreover, it is necessary that TEMPO's sensor frame maintain a consistent geographic frame of reference to ensure that sequential images of the same geographic location are accurately referenced to the same geographic coordinates.

Figure 1:
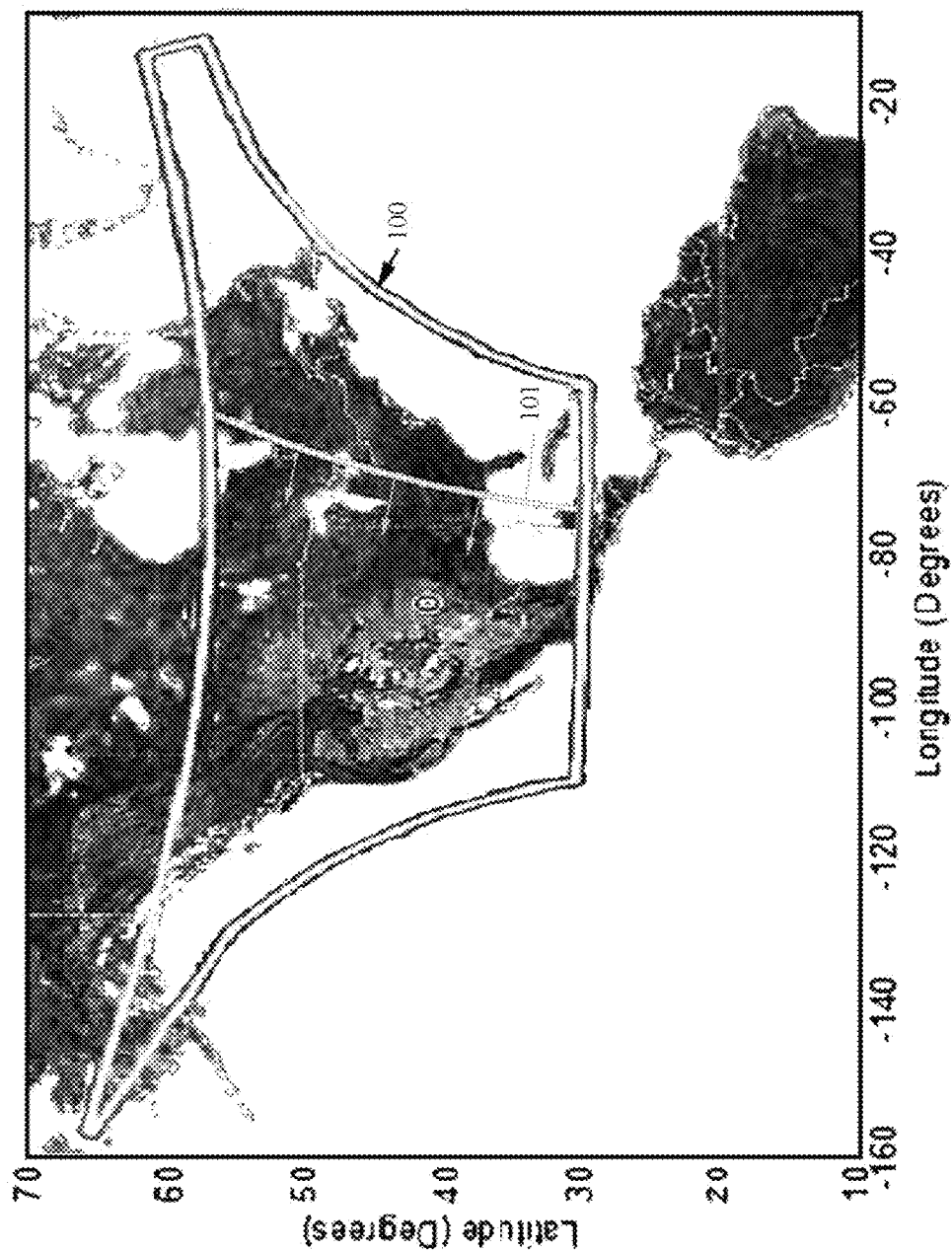
FIG. 1 illustrates the Field of Regard of the NASA TEMPO mission, and the location of its column of detectors, as projected onto a map of Greater North America.

To take measurements, TEMPO uses an imaging spectrometer with a scan mirror that sweeps the lines of sight for a column of detectors across the Earth. The detectors have an instantaneous field of view, while the whole area covered by the scan is known as the Field of Regard (FOR). Thus, the scan mirror sweeps the column of detectors or sensors across the FOR defined with respect to the rigid frame of the instrument. The FOR projected onto the surface of the Earth is illustrated in FIG. 1. TEMPO's full FOR covers GNA, as represented by the outlined area designated by reference character 100. The footprint of the scanning detector column is shown in FIG. 1 as the vertical curved line designated by reference character 101. The scanning detector's instantaneous field of view is nominally 4.5 km and scans from east to west. The arrow in FIG. 1 indicates the direction of movement of the detector column 101 across the full FOR 100 as implemented by the scan mirror. The apparent curvature of the detector column footprint 101 as it lies down on the Earth is due to the curvature of the Earth as viewed from a geostationary orbit. The TEMPO scanning column of detectors measures the spectra required to retrieve O3, NO2, SO2, H2CO, C2H2O2, H2O, aerosols, cloud parameters, and UVB radiation. A full scan of the FOR, spanning from approximately the east to the west coast of GNA, requires approximately an hour to complete. Once completed, the scan mirror returns to its initial position and the next scan begins. Although described herein for clarity with respect to a scanning type instrument, it should be understood that the instant invention may be applied to other types of remote sensing instruments inclusive of most any existing scanning or non-scanning imaging device.

Figure 2:
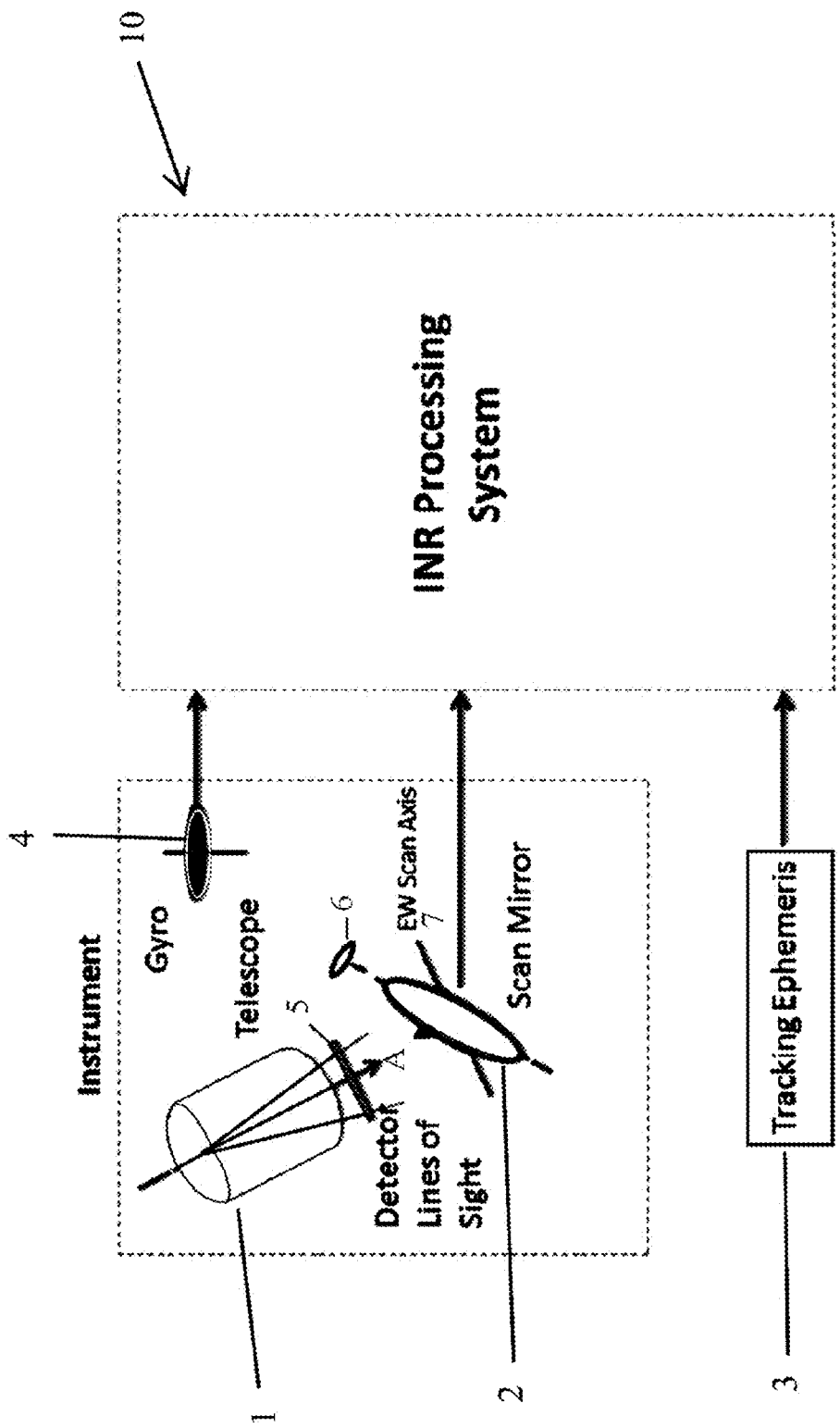
FIG. 2 is a diagram of the instrumentation required to implement the present invention.

FIG. 2 is a diagram of the instrumentation required to implement the instant invention, inclusive of the remote sensing device. For purposes of illustration, the illustrated remote sensing instrument has, for example, a telescope 1 with an image detector at its focal plane. In this instance, the axis of the barrel of telescope 1 is the optical axis of the telescope 1 as shown by the arrow (A). The optical axis (A) is directed toward and through the center of the optical footprints of a column of detectors 5. The ray paths traced from the detectors 5 out of the telescope 1 touch the scan mirror 2 and then point toward Earth after reflection. The scan mirror 2 is steered in two axes 6, 7. The mirror rotates around axis 7 to scan East-West and it could also articulate about another axis 6 to adjust the pointing in the orthogonal direction. The scanning image is formed on column of detectors 5. This scanning image has a footprint on the Earth's surface, as indicated by detector footprint 101 in FIG. 1. The footprint 101 moves in the direction of the arrow under control of the scan mirror 2, which slowly rotates to sweep the detector footprint 101 across the field of regard 100. In this way, the detector column 5 (FIG. 2) obtains measurements covering the entire field of regard every hour.

The embodiment shown in FIG. 2 also relies on certain peripheral instrumentation, navigation equipment, and a processing overhead all commonly contained within the navigation system of the host spacecraft or a ground processing system, and available for use by the remote sensing instrument, or contained within the remote sensing instrument itself. Of course, different types of remote sensing devices will have different types of peripheral equipment. For example, orientation of the scan mirror 2 may be ascertained from multiple single-axis encoders, single multi-axis encoder, motor control circuitry, digital, optical and/or hall-effect encoders, and in all such cases the orientation will be known to and taken into account in the herein described INR processing system.

As seen in FIG. 2 the peripheral system instrumentation also includes a tracking ephemeris 3 to specify the location of the spacecraft/remote sensing instrument in space. The tracking ephemeris 3 derives ephemeris data either indirectly such as, for example, by conventional ground tracking of the satellite's orbit, or directly by the means of an onboard global positioning system (GPS) receiver. In either case, tracking ephemeris 3 specifies the location of the spacecraft/remote sensing instrument in space using ephemeris data and, optional almanac data, from ground or the onboard GPS receiver in a known manner. In addition, an onboard gyroscope 4, such as a three-axis gyroscope package, tracks changes in the attitude of the system relative to inertial space. Recall that gyroscopes on their own cannot determine absolute orientation (roll, pitch, yaw angles) but only changes in orientation.

As seen at right, measurements taken from tracking ephemeris 3 and gyroscope 4 are fed into an Image Navigation and Registration (INR) processing system 10 in accordance with the present invention, which uses them to observe orbital motion of the vehicle and perturbations in the attitude of the optical axes at the scan mirror as described above. The INR processing system 10 calculates the apparent pixel shift due to these effects in real-time, and maintains accurate referencing of the pixels with respect to the geographical coordinate frame with a high degree of accuracy in near real-time. To do this, the INR processing system 10 computes directions of the lines of sight for each detector in a known manner relative to the rigid body of the instrument based upon the known orientation of the scan mirror 2, which is measured by one or more scan encoder(s) for its two axes 6, 7 to measure orientation. This computation provides a line-of-sight (LOS) vector for each detector. Various other parameters relevant to telescope 1, such as magnification and other optical alignments, are also known, albeit not necessarily exactly. Based upon the foregoing combination of at least: 1) location data for the spacecraft/remote sensing instrument in space (from Tracking Ephemeris 3); and 2) attitude changes in the spacecraft/remote sensing instrument pitch, roll and yaw (from gyroscope 4) both input to the INR processing system 10, plus 3) LOS vectors for each detector computed by the INR processing system 10, the INR system 10 calculates the position and orientation of the spacecraft or remote sensing instrument, and the geographic locations of the detector footprints, at a given time, t, and at a later time, after the passage of an amount of time $\Delta t$, which time can be noted as $1+\Delta t$.

However, the accuracy of the knowledge of the system state degrades with the change in time $\Delta t$. In particular, a phenomenon known as gyroscope angular random walk (ARW) renders attitude measurements less and less accurate over time. This is because the gyroscope 4 measures the change in the attitude of the instrument or spacecraft relative to inertial space, but not relative to any known point on the Earth's surface or elsewhere. Accordingly, the knowledge of the system's attitude state is propagated forward by the gyroscope without any external input. Because the gyroscope 4 is not a perfect instrument, the accuracy of attitude knowledge decreases over time, and becomes too inaccurate to be useful for image geo-location after typically only a few minutes without external correction. Accordingly, some external input is needed to pinpoint both the remote sensing instrument's position and orientation relative to the Earth to enable accurate geo-location of imagery taken from the remote sensor.

An exquisite system such as a GOES satellite uses a stellar-inertial attitude control system with a star tracker (as described in U.S. Pat. No. 6,362,464) to obtain extremely accurate measurements of the spacecraft's orientation over time augmented by star senses made by the remote sensing instrument itself. This system uses the stars to provide an absolute external reference point for orientation measurement. However, as described above, these systems are expensive to build and deploy, and low- or moderately-priced missions such as NASA's TEMPO mission do not necessarily have the budgets to implement this technology, implement this technology with the necessary precision, or necessarily to be hosted on a spacecraft that does.

Another type of data used to provide an external reference point for orientation is a known "landmark" or "ground control point" located on the Earth's surface. In a process known as AutoLandmark Registration, the system ingests an image taken by the device's sensor and scans a Landmark Catalog containing a list of landmarks and their characteristics to determine if a landmark is present in the imagery. The system then uses the known geographic coordinates of the landmark in the Catalog to orient the image from the sensor and, by taking into account the optical configurations of the telescope and other system configurations, determines the geographic locations of other pixels in the image. Technology implementing this method is currently in use in both the GOES and Meteosat ground systems. However, a major drawback of this method is that it is often impossible to make landmark matches because the intended feature is covered by clouds. In the context of a weather satellite, where the geo-location of clouds captured in the satellite's images is specifically sought, this is a major drawback.

Accordingly, the INR processing system 10 of the instant invention uses reference imagery to match against as a means to effectively transfer knowledge of pixel geo-locations from an exquisite system such as GOES to the imagery of the hosted payload by means of "tie-points". Reference imagery from exquisite systems such as, for example, GOES satellites is particularly desirable because of the high refresh rate of the imaging products produced by those systems. However, one having ordinary skill in the art will understand that high-level products from other systems, in geostationary or other types of orbits, can also be used according to the instant invention.

Figure 3:
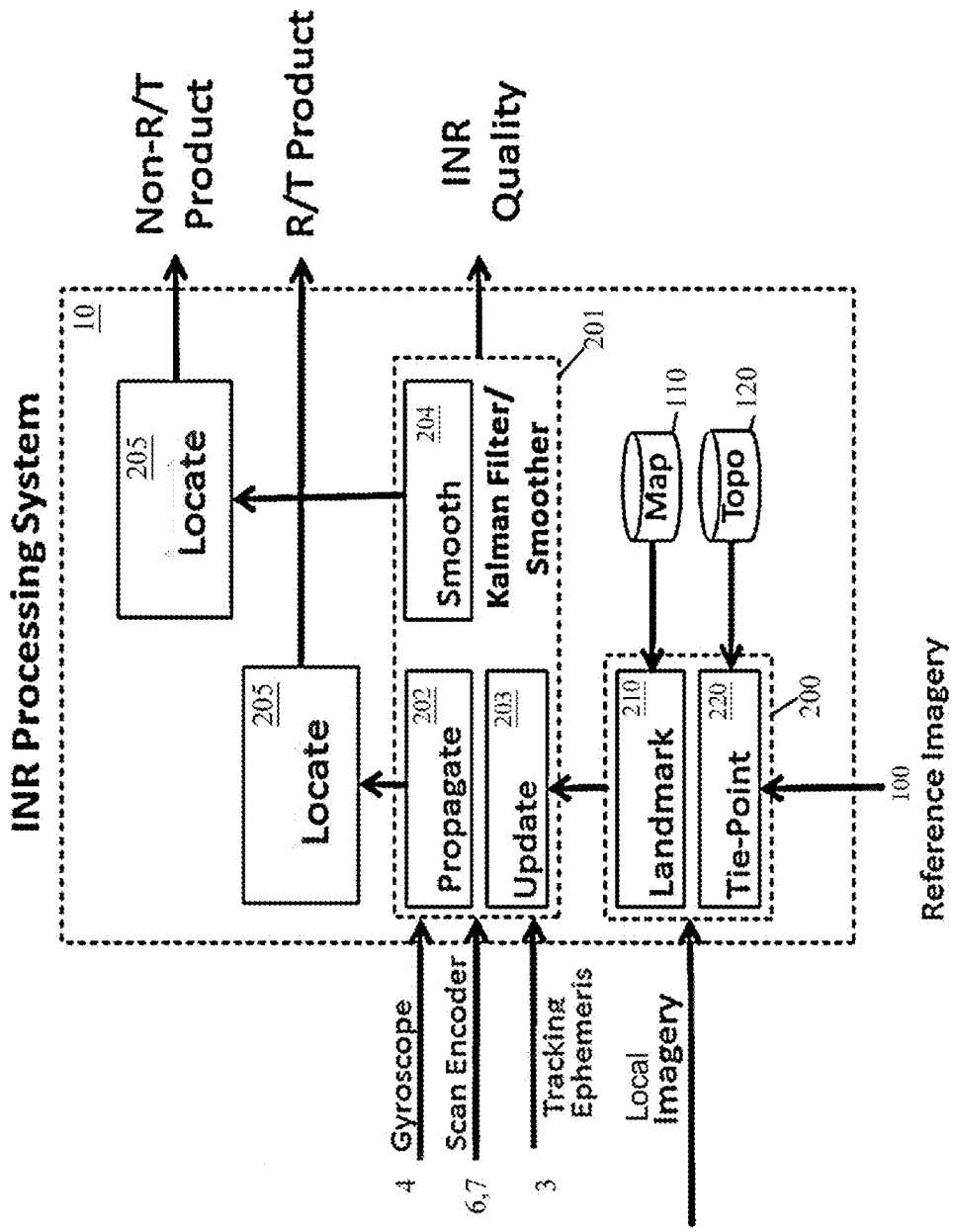
FIG. 3 is a flow chart showing the method according to the present invention.

FIG. 3 is a flow chart showing the architecture and process according to the present invention, wherein Reference Imagery 100 from an exquisite system such as GOES is used to improve the accuracy of the hosted payload INR processing system 10 as per FIG. 2. In accordance with the present invention, reference imagery 100 comprising geo-located pixels from the exquisite system operating over roughly the same geographic location as the present invention are transmitted to the hosted payload's INR processing system 10 (directly or via ground) and are stored locally. The reference imagery 100 may, for example, be provided as one or more GeoTIFF files, a public domain metadata standard with geo-reference information embedded within a TIFF file. Measurements of the pointing of the hosted payload are gathered from the imagery of the hosted payload by means of Tie-Points 220 linking the imagery from the hosted payload and the Reference Imagery 100, and optionally Landmarks 210 linking the imagery from the hosted payload and a digital Map 110. Given that the location of the exquisite system providing the Reference Imagery 100 may be separated in space from the location of the hosted payload, it is necessary to account for parallax (i.e., the apparent horizontal displacement of object as viewed from two different locations due to its height), which is done by means of a Topographic database 120 for objects on the surface of the Earth.

The INR processing system 10 of the present invention applies a linear quadratic estimation over a series of input measurements observed over time to compensate for apparent pixel shift and other perturbations in real-time, using image-to-image registration of the hosted payload imagery versus exquisite system imagery as one input to improve the accuracy of the hosted payload INR processing system. One embodiment of the method according to the present invention involves the use of a Kalman Filter, an algorithm that keeps track of the estimated state of a system, and an associated covariance, or uncertainty, over a period of time. The Kalman Filter is depicted generally at step 201 in FIG. 3, which also shows the Kalman Filter 201 receiving the following inputs: landmark 210/tie-point 220 data from step 200, location data from the tracking ephemeris 3, attitude data from the gyroscope 4, orientation data from scan mirror 2 sensor(s) 6, 7, and possibly other data as a matter of design choice indicative of alignment, scanner, and optical characteristics (e.g., telescope magnification). The Kalman Filter algorithm 201 represents the state of the system mathematically as a state vector, which consists of orbital position and velocity states, instrument attitude states, and other states to represent alignment, scanner, and optical characteristics (e.g. telescope magnification). The Kalman Filter has two (2) steps, which are repeated indefinitely during its operation: updating at step 202 and propagating at step 203. The Kalman Filter 201 updates its state at 202 with each geometric measurement, such as a landmark, tie-point, or GPS or ephemeris datum. To include the data from, for example, tracking ephemeris 3, a new tracking ephemeris datum is treated as a measurement type that is input into the Kalman Filter 201. With respect to the location and orientation of the host spacecraft or rigid frame of the instrument, the Kalman Filter 201 therefore updates its state at each new landmark, tie-point, or ephemeris datum. One having ordinary skill in the art will understand that additional known forms of reference data can also be used as inputs to the Kalman Filter 201, such as data from a star sensor or star sighting made through the aperture of the instrument, if available. Moreover, one having ordinary skill in the art will understand that, although the instant invention is described here with reference to data from a tracking ephemeris 3, gyroscope 4, etc., it may be used with data from any type of instrument capable of providing absolute or relative position and/or orientation data for the remote sensing instrument or its host spacecraft. In between updates, the state is propagated at 202 using the known equations of motion and with gyroscope 4 telemetry with respect to the system attitude. However, as described above, the longer the propagation period, the more unreliable the attitude knowledge becomes due to the angle random walk of the gyroscope 4. In the case of an orbiting satellite, attitude knowledge becomes unreliable when the propagation period exceeds a few minutes with most gyroscopes.

Accordingly, in step 200 according to the present invention, the system utilizes the reference imagery from the exquisite system operating over roughly the same geographic location as the system of the present invention to compare with imagery from the non-exquisite system. By way of example, the GOES-R satellite, scheduled to launch in 2016, will provide imagery of the Earth's western hemisphere from a geosynchronous orbit. It will be classified as an exquisite system with advanced geo-referencing capabilities. The GOES-R satellite will provide an output of image and measurement data in real-time every five (5) minutes. Thus, the GOES-R satellite product will refresh twelve (12) times during each TEMPO scan, which lasts for approximately one (1) hour. While reference imagery from any type of geosynchronous or highly elliptical, near-polar or similar orbital satellite with highly accurate INR can be utilized with the instant invention, imagery from geostationary systems is preferred due to the high refresh rate of those systems.

At each time of refresh of the exquisite system, the INR system 10 of the instant invention will upload the new reference imagery from the exquisite system to compare with imagery from the hosted payload system taken simultaneously or near-simultaneously as that from the exquisite system. Then, in real-time, the hosted INR system 10 will extract tie-points, or small templates, from the reference imagery at step 220, and remap them from the perspective of the exquisite system into the perspective of the hosted payload, and matches them at step 230 using a known algorithm such as the Normalized Cross-Correlation (NCC) as described, for example, in U.S. application 20080002878 and Zhao et al., "Image Matching by Normalized Cross-Correlation", IEEE International Conference on Acoustics, Speech and Signal Processing, Volume: 2 (2006). Because the exquisite system has highly accurate INR ability, the geographic location of the landmark or tie-point feature is known with precision in the reference imagery. The NCC algorithm measures the apparent position of that same feature in the hosted payload imagery, providing an external reference point for system attitude adjustment. In this way, knowledge of pixel geo-locations from an exquisite system is transferred to the hosted payload on a recurring basis. This information is fed into the Kalman Filter in step 201 as an additional external measurement type. The Kalman Filter 201 updates upon the receipt of each match of pixel geo-location from exquisite to hosted payload system, providing improved estimates of the overall state of the system. This state is used in the step represented in FIG. 3 as step 205, in which INR processing system 10 "locates", e.g., calculates momentary locations of all detector footprints and provides a real-time (R/T) location product. Based on the tie-point data from step 220, or on the updated system state from the Kalman Filter 201, the imaging device will be able to provide improved INR for all pixels in the instant hosted payload system imagery and moving forward.

In an optional smoothing step 204, the Kalman Filter adds state smoothing (denoted "Smoother" in FIG. 3). This step is valuable in the case of an instrument that is only sensitive to visible light. Such an instrument will have an initialization transient at the start of each orbit day because the state of the system will have been propagated overnight with no external reference and, by dawn, will have become inaccurate. Initial real-time geo-location accuracy will be poor until the Kalman Filter reconverges. The smoother alleviates some of these inaccuracies by, in essence, running a Kalman Filter backwards in time, so that a reconverged state of the system could then be updated and propagated backwards to yield a more accurate estimate of the system state at the dawn of the orbit day. However, this smoothing operation would only be useful in the production of a non-real-time product 205 during the entire diurnal cycle. There are many choices for a Kalman Filter-Smoother 204 implementation, one of which is the Rauch-Tung-Striebel (RTS) algorithm. However, one having ordinary skill in the art would understand that any known smoothing method capable of achieving a more accurate location product may be used. The result of the smoothing function is shown in step 204 of FIG. 3 where the image location is updated after the smoothing operation, resulting in a non-real-time (Non-R/T) product. The residuals from the Kalman Filter-Smoother 204 also indicate the quality of the INR performance achieved by the INR processing system 10.

The simultaneous nature of the comparison of reference and hosted payload imagery will allow even clouds to be used as reference points in the comparison. However, it should be noted that in almost all cases, the INR processing system 10 will have to account for a parallax between the reference and hosted payload imagery due to the different vantage points from which the two systems are likely to view the Earth's surface at any given time. The parallax comes into play in step 200, wherein the INR processing system 10 remaps the reference imagery from the perspective of the exquisite system into the perspective of the hosted payload. Under clear skies, the system can remedy the parallax by using a topographic database pertaining to the three-dimensional tie-point. As can be understood by one of ordinary skill in the art, knowledge of the three-dimensional attributes of the tie-point will allow the INR processing system 10 to translate same from one perspective to another, and then based on that mathematical translation, to translate the remainder of the image. When clouds prevent the hosted payload from finding any clear-sky tie-points, one direction (that parallel to the baseline between the two satellites) should be down-weighted in the Kalman Filter update step, in step 203 of the present invention, in accordance with the uncertainty of the altitude and sensitivity to parallax at the site. The axis perpendicular to the baseline is unaffected.

The use of reference imagery from a plurality of exquisite systems, both covering an overlapping area that is also substantially overlapping with the FOR for the remote sensing instrument, will enable binocular tie-points for which the same feature imaged in the FOR of the remote sensing instrument is matched to the imagery of the plurality of nearly simultaneous reference images. By way of example, the TEMPO will be positioned between the eastern and western GOES spacecraft, enabling binocular tie-points over CONUS. With each binocular tie-point, the parallax provides the height of the feature by means of the parallax between stereo pairs.

Although a preferred embodiment of the invention has now been described, it should be understood that the system will function with landmark, tie-point, or star measurement updates alone or in combination, but preferably functions with at least tie-points to reference imagery from an exquisite system. Moreover, one skilled in the art will understand that the components and/or steps included in the INR processing system 10 of FIG. 3 may be performed locally or remotely at a ground station or remote vehicle.

It should now be apparent that the above-described invention provides an improved INR system capable of utilizing INR data transferred from an exquisite system, such as a GOES satellite, to improve the accuracy of its own INR without the use of an advanced attitude control system. The system is appropriate for use in connection with a low cost satellite remote sensing device hosted as a secondary payload on a spacecraft without sophisticated attitude modeling capabilities.

This has been a description of the present invention and, the preferred embodiment of the present invention, as well as various alternate embodiments of the present invention.

I claim:

1. A computer method for calculating position and orientation of a first vehicle using georeferenced digital imagery taken remotely from a second vehicle, comprising the steps of:
    transferring georeferenced digital images of earth from said second vehicle and storing said georeferenced digital images of earth in computer memory;
    acquiring images of earth at said first vehicle and storing said earth images in computer memory;
    executing a software application at an INR computer processor, said application comprising a plurality of software instructions stored on non-transitory computer-readable medium for instructing the INR computer processor to perform the steps of,
        accessing from said computer memory said acquired images of earth from said first vehicle and said georeferenced digital images of earth from said second vehicle and comparing said acquired earth images to said georeferenced earth images at said INR processor by identifying tie-points in said georeferenced images of earth, and
        periodically estimating a current and future position and orientation of said fir vehicle by said INR processor periodically updating a linear quadratic estimation of said current and future position and orientation of said vehicle with said georeferenced image tie-points.

2. The method according to claim 1, wherein said step of inputting georeferenced images of earth further comprises inputting georeferenced images of earth captured at substantially the same time and of a common area of earth as the images acquired in said acquiring step.

3. The method according to claim 1, further comprising a step of inputting attitude data from a gyroscope aboard said vehicle to said INR processor.

4. The method according to claim 3, wherein said attitude data is input in real time from said gyroscope to said INR processor.

5. The method according to claim 3, further comprising a step of inputting ephemeris data from a tracking ephemeris to said INR processor.

6. The method according to claim 5, wherein said ephemeris data is input in real time from said tracking ephemeris to said INR processor.

7. The method according to claim 5, wherein said step of periodically estimating a current and future position and orientation of said vehicle further comprises periodically updating a linear quadratic estimation of said current and future position and orientation of said vehicle with said ephemeris data, attitude data, and georeferenced image tie-points by said INR processor.

8. The method according to claim 7, wherein said vehicle comprises an on-board imager having at least one detector, and said method further comprising a step of calculating a line-of-sight (LOS) vector for said at least one detector at said INR processor.

9. The method according to claim 8, wherein said step of periodically estimating a current and future position and orientation of said vehicle comprises periodically updating said linear quadratic estimation of said current and future position and orientation of said vehicle with said LOS vector.

10. The method according to claim 1, further comprising a step of smoothing said periodically estimated current and future position and orientation of said vehicle.

11. The method according to claim 1, wherein said step of comparing comprises stereo-matching said acquired earth images to said georeferenced earth images at said INR processor.

12. The method according to claim 1, wherein said linear quadratic estimation comprises a Kalman filter.

13. The method according to claim 1, wherein said step of comparing said acquired earth images to said georeferenced earth images at said INR system further comprises determining said INR system georeferenced tie-points of earth by a normalized cross-correlation algorithm.

14. The method of claim 1, wherein said step of periodically estimating a current and future position and orientation of said vehicle comprises a first position and orientation at a given time, t, and a second position and orientation a later time t+Δt.

15. The method of claim 1, further comprising a step of maintaining a database of said georeferenced images of earth.

16. A system for improved image navigation and registration of a first satellite using images acquired from a second satellite, the first satellite having an image navigation and registration (INR) system for generating INR data, a telescope with a scan mirror rotatable about two axes for periodically scanning a field of regard, a scan encoder for measuring orientation of said scan mirror about said two axes, and at least one imaging sensor configured to acquire images of a portion of the Earth's surface, the system comprising:
    an INR computer including a processor and non-transitory computer-readable medium for inputting the images acquired from said first satellite and georeferenced images of the same portion of the Earth's surface acquired from said second satellite at substantially the same time, said INR computer further comprising,
        a comparison software module including a plurality of software instructions stored on said non-transitory computer-readable medium for instructing the INR processor to compare features of the georeferenced pixels of earth obtained from the second satellite to determine georeferenced tie-points, and
        an INR software module including a plurality of software instructions stored on said non-transitory computer-readable medium for instructing the INR processor to periodically estimate a current and future position and orientation of said first satellite by periodically updating a linear quadratic estimation of said current and future position and orientation with said georeferenced tie-points.

17. The system according to claim 16, further comprising a gyroscope for monitoring orientation of said first satellite.

18. The system according to claim 17, wherein said INR software module periodically estimates a current and future position and orientation of said first satellite by periodically updating a linear quadratic estimation with said orientation.

19. The system according to claim 18, further comprising an ephemeris tracker for determining position of said first satellite.

20. The system according to claim 19, wherein said INR software module periodically estimates a current and future position and orientation of said first satellite by periodically updating a linear quadratic estimation with said first satellite position.

21. The system according to claim 20, wherein said INR computer further comprises a line-of-sight (LOS) software module including a plurality of software instructions stored on said non-transitory computer-readable medium for calculating a line-of-sight (LOS) vector for said first satellite.

22. The system according to claim 21, wherein said INR software module periodically estimates a current and future position and orientation of said first satellite by periodically updating said linear quadratic estimation of said current and future position with said LOS vector.

23. The system for improved image navigation and registration according to claim 16, wherein said comparison software module compares by stereo-matching features of georeferenced pixels of earth obtained from said second satellite to images acquired by the first satellite using a Normalized Cross-Correlation (NCC) algorithm.

24. A computer method for improved image navigation and registration of a vehicle, comprising the steps of:
 acquiring a first georeferenced digital image of a portion of earth locally at said vehicle and storing said first georeferenced digital image in computer memory;
 acquiring a second digital georeferenced image of the same portion of earth taken at substantially the same time from a different vehicle and storing said second georeferenced digital image in computer memory;
 executing a computer program on a computer processor to perform the steps of,
  comparing said first and second georeferenced earth images and identifying tie-points, and
  periodically estimating a current and future position and orientation of said vehicle by periodically updating a linear quadratic function with said georeferenced tie-points.

25. The method of claim 24, further comprising a step of acquiring attitude data of said vehicle, said step of periodically estimating a current and future position and orientation of said vehicle comprising periodically updating said linear quadratic function with said georeferenced tie-points, ephemeris data and attitude data.

26. The method of claim 25, further comprising a step of acquiring ephemeris data of said vehicle, said step of periodically estimating a current and future position and orientation of said vehicle comprising periodically updating said linear quadratic function with said georeferenced tie-points and ephemeris data.

27. The method of claim 26, further comprising a step of calculating a line-of-sight (LOS) vector, said step of periodically estimating a current and future position and orientation of said vehicle comprising periodically updating said linear quadratic function with said georeferenced tie-points, ephemeris data, attitude data and LOS vector.

28. The method according to claim 24, further comprising a step of smoothing said periodically estimated current and future position and orientation of said vehicle.

29. The method according to claim 24, wherein said step of comparing comprises stereo-matching said first and second georeferenced images.

30. The method according to claim 24, wherein said step of comparing comprises subjecting said first and second georeferenced images to a normalized cross-correlation algorithm.

31. The method according to claim 24, wherein said step of periodically estimating comprises using a Kalman filter.

32. The method of claim 24, further comprising a step of maintaining a database of said second georeferenced earth images.

33. The method of claim 27, wherein said calculating step comprises the substeps of:
 calculating a position and orientation of the of said vehicle based on said ephemeris data, attitude data, and line-of-sight (LOS) vectors; and
 correcting said calculated position and orientation based on said tie-point data.

34. The method of claim 24, wherein said different vehicle is any one of a geosynchronous, highly elliptical, near-polar or similar orbital satellite.

35. The method of claim 24, wherein said different vehicle is a geostationary satellite.

36. The method of claim 24, wherein said step of periodically estimating current and future position and orientation of said vehicle comprises periodically updating a linear quadratic function with tie-points and landmark data.

* * * * *